(12) United States Patent
Dorum et al.

(10) Patent No.: US 11,420,649 B2
(45) Date of Patent: Aug. 23, 2022

(54) METHOD, APPARATUS, AND COMPUTER PROGRAM PRODUCT FOR GENERATING TURN PATHS THROUGH AN INTERSECTION

(71) Applicant: HERE Global, B.V., Eindhoven (NL)

(72) Inventors: Ole Henry Dorum, Chicago, IL (US); Liming Wang, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 372 days.

(21) Appl. No.: 16/827,945

(22) Filed: Mar. 24, 2020

(65) Prior Publication Data

US 2021/0300410 A1    Sep. 30, 2021

(51) Int. Cl.
*G08G 1/056* (2006.01)
*B60W 60/00* (2020.01)
*G06K 9/62* (2022.01)

(52) U.S. Cl.
CPC .... *B60W 60/0011* (2020.02); *B60W 60/0025* (2020.02); *G06K 9/6277* (2013.01); *G08G 1/056* (2013.01)

(58) Field of Classification Search
CPC .................................................. B60W 60/0011
See application file for complete search history.

(56) References Cited

U.S. PATENT DOCUMENTS

| | | | |
|---|---|---|---|
| 7,797,104 | B2 | 9/2010 | Finn et al. |
| 9,273,976 | B2 | 3/2016 | Davidson |
| 9,672,759 | B2 | 6/2017 | Hofmann et al. |
| 9,857,191 | B2 | 1/2018 | Mason et al. |

(Continued)

FOREIGN PATENT DOCUMENTS

| | | | |
|---|---|---|---|
| CA | 3032812 A1 | * 2/2018 | ............ G01C 21/32 |
| CN | 103323012 A | * 9/2013 | |

(Continued)

OTHER PUBLICATIONS

Extended European Search Report for European Application No. 21164222.8 dated Jul. 29, 2021, 9 pages.
Agamennoni, G. et al., *Robust Inference of Principal Road Paths for Intelligent Transportation Systems*, IEEE Transactions on Intelligent Transportation Systems, vol. 12, No. 1 (Mar. 2011) 298-308.
Agamennoni , G.et al. *Technical Report: Inference of Principal Road Paths Using GPS Data*, The University of Sydney, Australian Center for Field Robotics: Sydney, Australia, 2010(Jun. 4, 2010) 1-23.

(Continued)

*Primary Examiner* — Shelley Chen
(74) *Attorney, Agent, or Firm* — Peter Yu; HERE Technologies

(57) ABSTRACT

A method is provided for gathering probe data and using the gathered data to creating map intersection turn paths. Methods may include: receiving probe data from a plurality of probes passing through an intersection; identifying a turn maneuver of the intersection including at least an incoming and an outgoing road link; map matching probe data from the plurality of probes passing through the intersection to the turn maneuver, where probe data map matched to the turn maneuver includes turn maneuver probe data; identifying a plurality of seed points, where the plurality of seed points are iteratively created from the turn maneuver probe data; generating a curve representing a geometric shape of a turn path corresponding to the turn maneuver using the seed points; fitting a spline to vertices of the curve representing a geometric shape of the turn path; and providing for guidance of a vehicle based on the spline of the turn path.

22 Claims, 16 Drawing Sheets

(56) References Cited

U.S. PATENT DOCUMENTS

| | | | |
|---|---|---|---|
| 9,978,161 | B2 | 5/2018 | Dorum |
| 10,001,378 | B2 | 6/2018 | Mund |
| 10,096,248 | B2 | 10/2018 | Penna et al. |
| 10,352,718 | B2 | 7/2019 | Wu et al. |
| 10,444,020 | B2 | 10/2019 | Dorum |
| 10,546,400 | B2 | 1/2020 | Dorum |
| 2005/0137791 | A1* | 6/2005 | Agrawala ............... G06T 11/60 701/454 |
| 2008/0103694 | A1* | 5/2008 | Dix ...................... G05D 1/0219 701/425 |
| 2009/0306881 | A1 | 12/2009 | Dolgov et al. |
| 2013/0144525 | A1 | 6/2013 | Yang |
| 2016/0245657 | A1* | 8/2016 | Dorum ................... G01C 21/32 |
| 2016/0364985 | A1 | 12/2016 | Penna et al. |
| 2017/0294036 | A1* | 10/2017 | Dorum ................. G06T 11/203 |
| 2018/0275277 | A1* | 9/2018 | Li .......................... G01S 17/89 |

FOREIGN PATENT DOCUMENTS

| | | | | |
|---|---|---|---|---|
| CN | 103778783 | A | * | 5/2014 |
| CN | 104899357 | A | * | 9/2015 |
| CN | 105788273 | A | * | 7/2016 |
| CN | 107328423 | A | * | 11/2017 ............. G01C 21/30 |
| CN | 108 053 679 | A | | 5/2018 |
| CN | 108091133 | A | * | 5/2018 ........... G08G 1/0112 |
| CN | 108180914 | A | * | 6/2018 ............. G01C 21/20 |
| CN | 109062223 | A | * | 12/2018 |
| CN | 111402424 | A | * | 7/2020 ........... G06T 19/006 |
| CN | 109323705 | B | * | 9/2020 ......... G01C 21/3415 |
| EP | 3 104 120 | A1 | | 12/2016 |

OTHER PUBLICATIONS

Biagioni, J. et at., *Inferring Road Maps From Global Positioning System Traces: Survey and Comparative Evaluation*, Department of Computer Science, University of Illinois at Chicago (Nov. 2011) 21 pages.

Deng, M. et al., *Generating Urban Road Intersection Models From Low-Frequency GPS Trajectory Data*, International Journal of Geographical Information Science, vol. 32, No. 12 (2018) 2337-2361.

Zheng, L. et al., *A High-Definition Road-Network Model for Self-Driving Vehicles*, International Journal of Geo-Information, 7, 417 (2018) 14 pages.

U.S. Appl. No. 16/827,886, filed Mar. 24, 2020, In re: Dorum, entitled: *Method, Apparatus, and Computer Program Product for Generating Turn Paths Through an Intersection*.

U.S. Appl. No. 16/827,968, filed Mar. 24, 2020, In re: Dorum, entitled *Method, Apparatus and Computer Program Product for Generating Parking Lot Geometry*.

U.S. Appl. No. 16/827,975, filed Mar. 24, 2020, In re: Dorum, entitled *Method, Apparatus, and Computer Program Product for Generating a Map of Road Links of a Parking Lot*.

Extended European Search Report for European Application No. 21163913.3 dated Aug. 27, 2021, 8 pages.

Gao et al., "VeMap: Indoor Road Map Construction via Smartphone-based Vehicle Tracking", 2016 IEEE Global Communications Conference (GLOBECOM), (Dec. 4-8, 2016), 6 pages.

\* cited by examiner

METHOD, APPARATUS, AND COMPUTER PROGRAM PRODUCT FOR GENERATING TURN PATHS THROUGH AN INTERSECTION

TECHNOLOGICAL FIELD

An example embodiment of the present disclosure relates to creating map intersection turn paths, and more particularly, to automatically creating two- or three-dimensional intersection turn path spline curves from probe sources.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Autonomous and semi-autonomous vehicle control requires detailed information relating to roads along which vehicles will travel. Straight sections of road are considerably less complex than intersections of roads where numerous paths are available. Autonomous and semi-autonomous vehicle control requires awareness of all available paths to successfully and efficiently navigate through a region.

BRIEF SUMMARY

A method, apparatus, and computer program product are provided in accordance with an example embodiment for creating map intersection turn paths, and more particularly, to automatically create two- or three-dimensional intersection turn path spline curves from probe sources. Embodiments provided herein include an apparatus having at least one processor and at least one memory including computer program code, the at least one memory and computer program code configured to, with the processor, cause the apparatus to: receive probe data from a plurality of probes passing through an intersection; identify a turn maneuver of the intersection including at least an incoming road link and an outgoing road link; map match probe data from the plurality of probes passing through the intersection to the turn maneuver, where probe data map matched to the turn maneuver includes turn maneuver probe data; identify a plurality of seed points, where the plurality of seed points are iteratively created from the turn maneuver probe data; generate a curve representing a geometric shape of a turn path corresponding to the turn maneuver using the seed points; fit a spline to vertices of the curve representing a geometric shape of the turn path; and provide for guidance of a vehicle based on the spline of the turn path.

According to some embodiments, causing the apparatus to identify a plurality of seed points may include causing the apparatus to: segment the turn maneuver probe data into a plurality of grid cells; compute a stable weighted center of mass for turn maneuver probe data in each of the plurality of grid cells; and iteratively apply a mean shift to the stable weighted center of mass for the plurality of grid cells until a location change of the stable weighted center of mass is less than a predetermined distance to obtain seed points for the plurality of grid cells. The stable weighted center of mass for a cell may be constrained to move perpendicularly to a principal heading direction of the respective cell. The mean shift of the stable weighted center of mass for the plurality of cells may be applied with a weighting function. The weighting function may include a Gaussian kernel function.

Causing the apparatus of some embodiments to generate the curve representing the geometric shape of the turn path using the seed points may include causing the apparatus to: identify principal components of the shifted stable weighted centers of mass for the plurality of grid cells; establish an orientation of the principal components of the shifted stable weighted centers of mass for the plurality of grid cells; and generate the curve representing the geometric shape of the turn path based, at least in part, on the orientation of the principal components of the shifted stable weighted centers of mass for the plurality of grid cells. Causing the apparatus to generate the curve representing the geometric shape of the turn path using the seed points may include causing the apparatus to: establish a heading density of turn maneuver probe data within a predefined radius around the shifted stable weighted centers of mass for the plurality of grid cells; and generate the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

According to some embodiments, causing the apparatus to fit a spline to the vertices of the curve representing a geometric shape of the turn path may include causing the apparatus to create a knot vector for the spline, where a parametric distance between each knot is inversely proportional to a curvature of the curve. Causing the apparatus to fit a spline to the vertices of the curve representing a geometric shape of the turn path may optionally include causing the apparatus to assign a parametric B-spline value to each curve vertex based on a vertex arc-length location along the curve. Causing the apparatus to fit a spline to the vertices of the curve representing a geometric shape of the turn path may include causing the apparatus to reduce a change of curvature using a regularization function to smooth a curvature of the spline with a regularization factor. Causing the apparatus to generate a curve representing a geometric shape of the turn path using the seed points may include causing the apparatus to: map match the seed points using Wasserstein distance based matching; discard seed points having a heading angle difference above a predefined threshold; and generate a curve representing the geometric shape of the turn path based on seed points having a heading angle difference below the predefined threshold.

Embodiments of the present disclosure may include a computer program product having at least one non-transitory computer-readable storage medium having computer-executable program code instructions stored therein, the computer-executable program code instructions including program code instructions to: receive probe data from a plurality of probes passing through an intersection; identify a turn maneuver of the intersection including at least an incoming road link and an outgoing road link; map match probe data from the plurality of probes passing through the intersection to the turn maneuver, where probe data map matched to the turn maneuver includes turn maneuver probe data; identify a plurality of seed points, where the plurality of seed points are iteratively created from the turn maneuver probe data; generate a curve representing a geometric shape of a turn path corresponding to the turn maneuver using the seed points; fit a spline to vertices of the curve representing a geometric shape of the turn path; and provide for guidance of a vehicle based on the spline of the turn path.

The program code instructions to identify the plurality of seed points may include program code instructions to: segment the turn maneuver probe data into a plurality of grid cells; compute a stable weighted center of mass for turn maneuver probe data in each of the plurality of grid cells; and iteratively apply a mean shift to the stable weighted center of mass for the plurality of grid cells until a location change of the stable weighted center of mass is less than a predetermined distance to obtain seed points for the plurality of grid cells. The stable weighted center of mass for a cell may be constrained to move perpendicularly to a principal heading direction of the respective cell. The mean shift of the stable weighted center of mass for the plurality of cells may be applied with a weighting function. The weighting function may include a Gaussian kernel function.

According to an example embodiment, the program code instructions to generate the curve representing the geometric shape of the turn path using the seed points may include program code instructions to: identify principal components of the shifted stable weighted centers of mass for the plurality of grid cells; establish an orientation of the principal components of the shifted stable weighted centers of mass for the plurality of grid cells; and generate the curve representing the geometric shape of the turn path based, at least in part, on the orientation of the principal components of the shifted stable weighted centers of mass for the plurality of grid cells. The program code instructions to generate the curve representing the geometric shape of the turn path using the seed points may include program code instructions to: establish a heading density of turn maneuver probe data within a predefined radius around the shifted stable weighted centers of mass for the plurality of grid cells; and generate the curve representing the geometric shape of the turn path based, at least in part, on the orientation of the principal components of the shifted stable weighted centers of mass for the plurality of grid cells and on the heading density of the shifted stable weighted centers of mass for the plurality of grid cells. The program code instructions to generate a curve representing a geometric shape of the turn path using the seed points may include program code instructions to: map match the seed points using Wasserstein distance based matching; and generate a curve representing the geometric shape of the turn path based on seed points having a heading angle difference below a predefined threshold.

Embodiments provided herein may include a method including: receiving probe data from a plurality of probes passing through an intersection; identifying a turn maneuver of the intersection including at least an incoming road link and an outgoing road link; map matching probe data from the plurality of probes passing through the intersection to the turn maneuver, where probe data map matched to the turn maneuver includes turn maneuver probe data; identifying a plurality of seed points, where the plurality of seed points are iteratively created from the turn maneuver probe data; generating a curve representing a geometric shape of a turn path corresponding to the turn maneuver using the seed points; fitting a spline to vertices of the curve representing a geometric shape of the turn path; and providing for guidance of a vehicle based on the spline of the turn path.

Identifying the plurality of seed points includes: segmenting the turn maneuver probe data into a plurality of grid cells; computing a stable weighted center of mass for turn maneuver probe data in each of the plurality of grid cells; and iteratively applying a mean shift to the stable weighted center of mass for the plurality of grid cells until a location change of the stable weighted center of mass is less than a predetermined distance to obtain seed points for the plurality of grid cells. Generating the curve representing the geometric shape of the turn path using the seed points may include: establishing a heading density of turn maneuver probe data within a predefined radius around the shifted stable weighted centers of mass for the plurality of grid cells; and generating the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

Embodiments provided herein may include an apparatus including: means, such as a processor or the like, for receiving probe data from a plurality of probes passing through an intersection; means, such as a processor or the like, for identifying a turn maneuver of the intersection including at least an incoming road link and an outgoing road link; means, such as a processor or the like, for map matching probe data from the plurality of probes passing through the intersection to the turn maneuver, where probe data map matched to the turn maneuver includes turn maneuver probe data; means, such as a processor or the like, for identifying a plurality of seed points, where the plurality of seed points are iteratively created from the turn maneuver probe data; means, such as a processor or the like, for generating a curve representing a geometric shape of a turn path corresponding to the turn maneuver using the seed points; means, such as a processor or the like, for fitting a spline to vertices of the curve representing a geometric shape of the turn path; and means, such as a processor, a user interface, or the like, for providing for guidance of a vehicle based on the spline of the turn path.

The means for identifying the plurality of seed points includes: means, such as a processor or the like, for segmenting the turn maneuver probe data into a plurality of grid cells; means, such as a processor or the like, for computing a stable weighted center of mass for turn maneuver probe data in each of the plurality of grid cells; and means, such as a processor or the like, for iteratively applying a mean shift to the stable weighted center of mass for the plurality of grid cells until a location change of the stable weighted center of mass is less than a predetermined distance to obtain seed points for the plurality of grid cells. The means for generating the curve representing the geometric shape of the turn path using the seed points may include: means, such as a processor or the like, for establishing a heading density of turn maneuver probe data within a predefined radius around the shifted stable weighted centers of mass for the plurality of grid cells; and means, such as a processor or the like, for generating the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

BRIEF DESCRIPTION OF THE DRAWINGS

Figure 1:
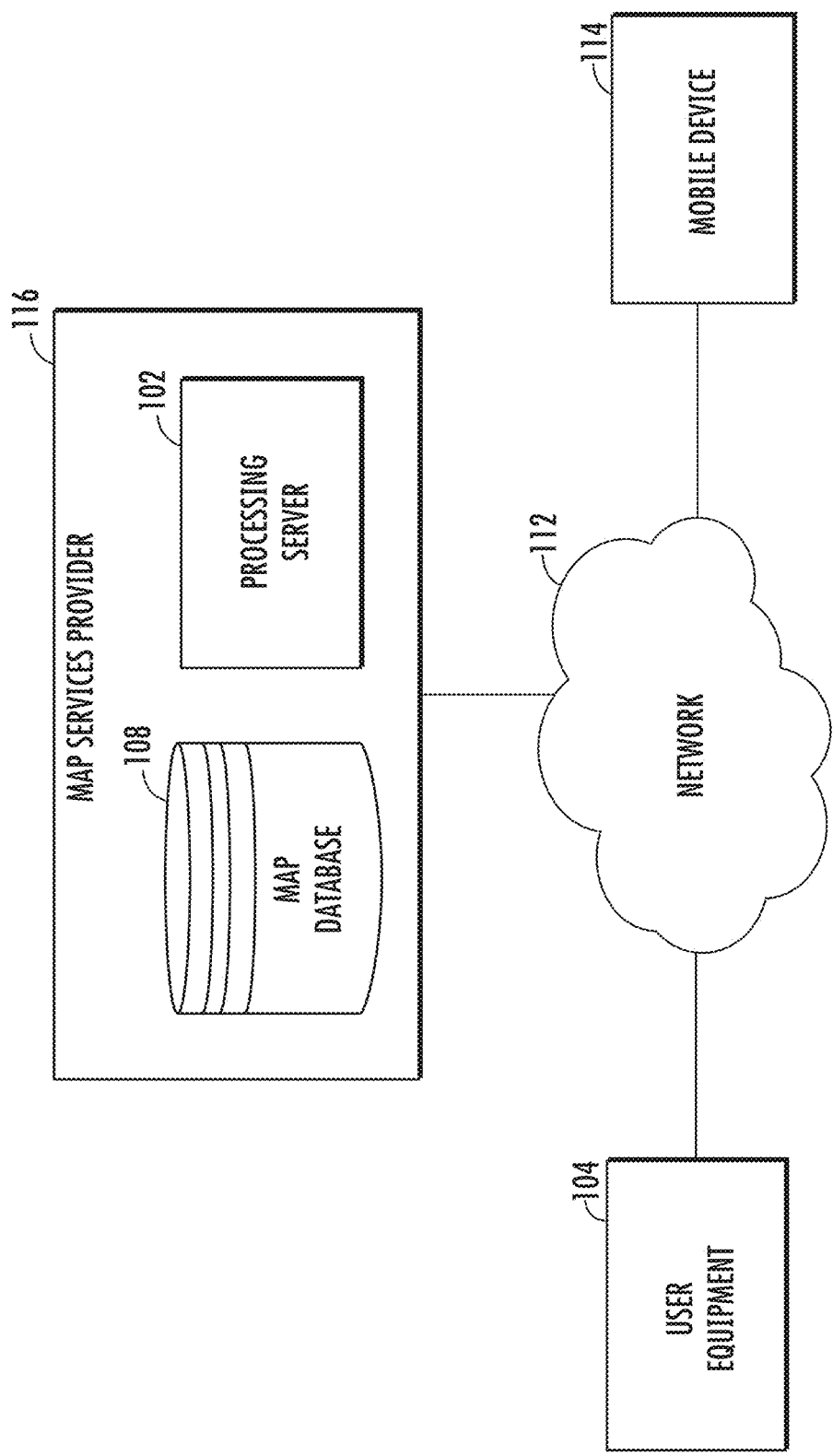
Figure 2:
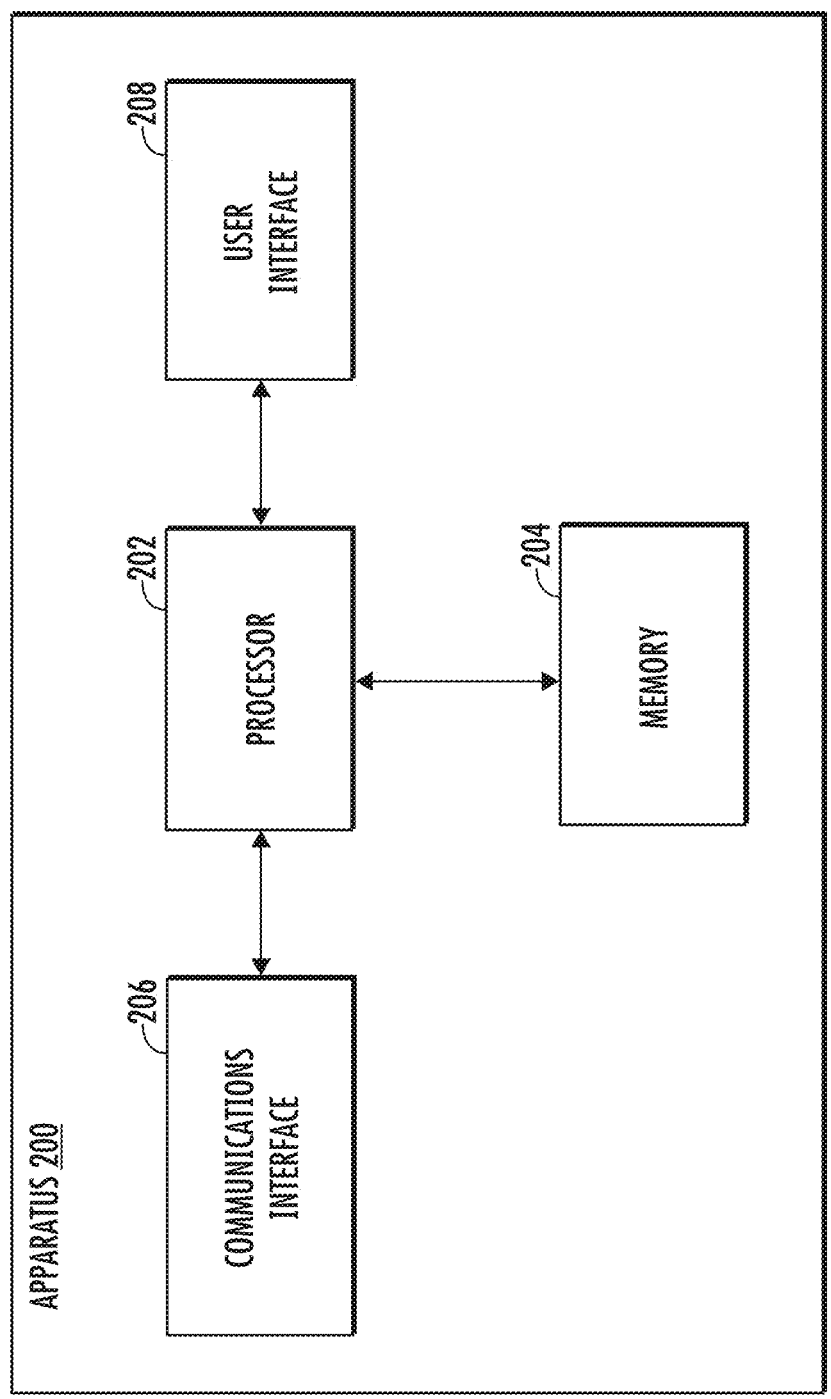
Figure 3:
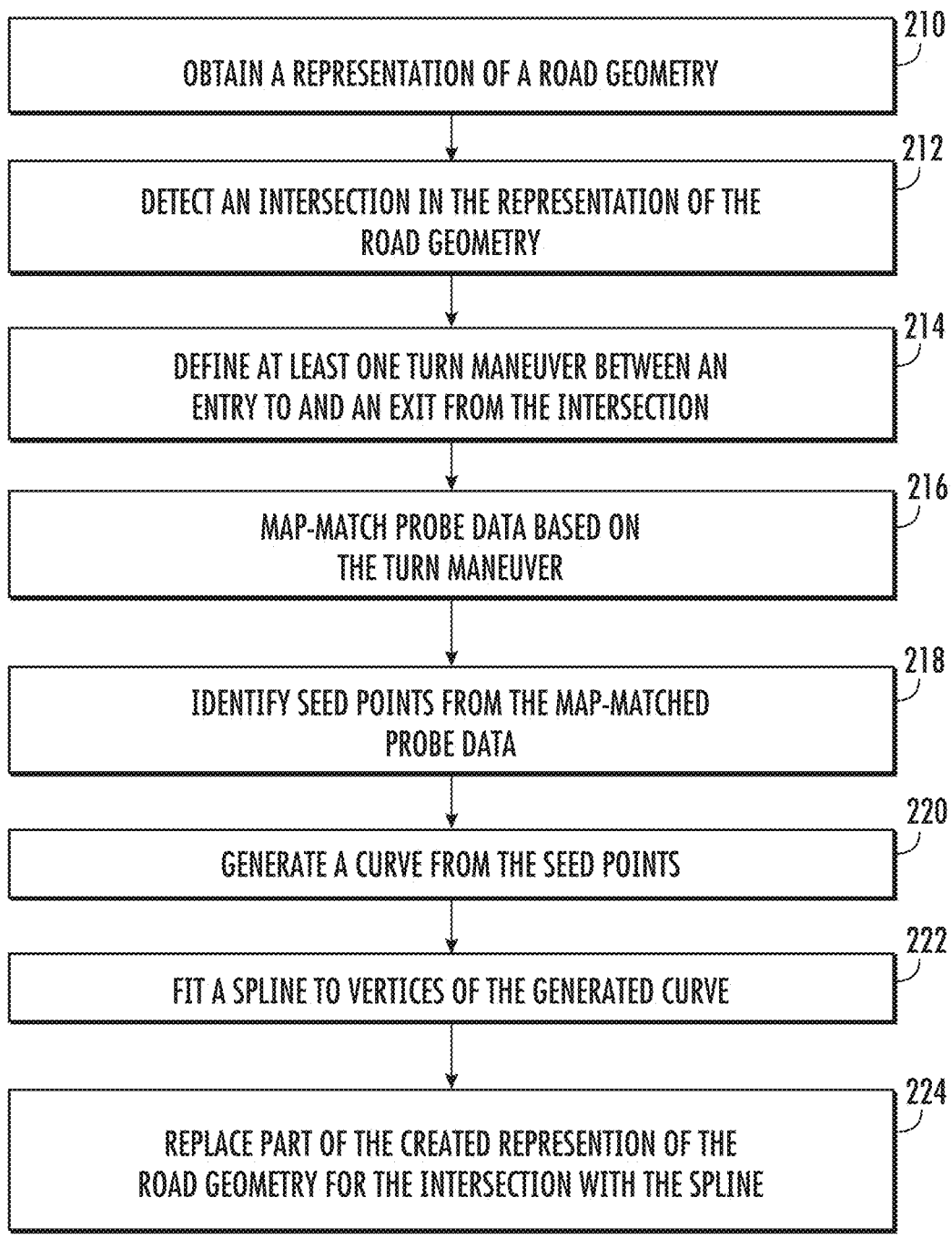
Figure 4:
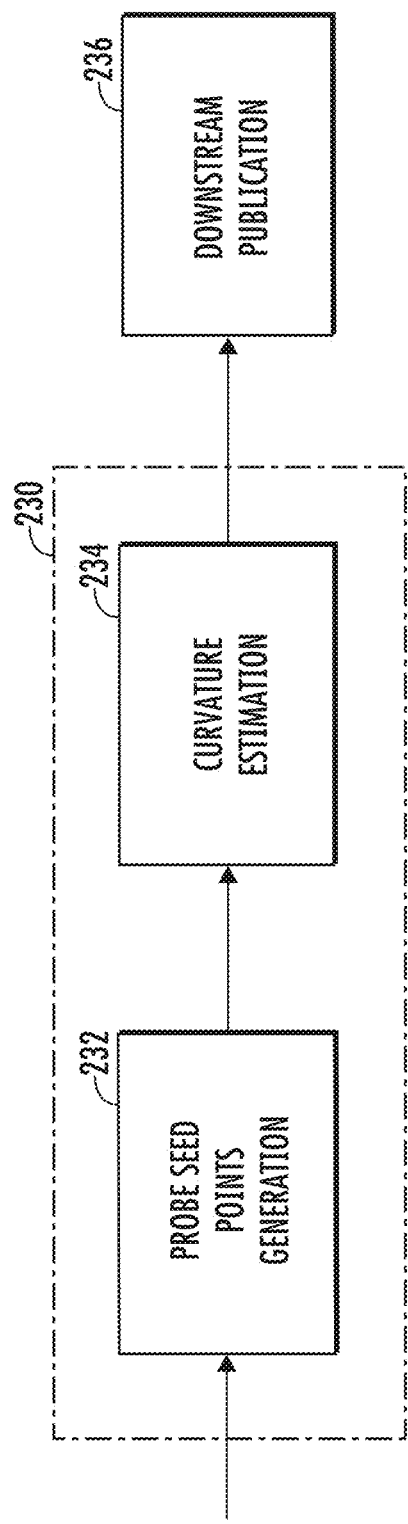
Figure 5:
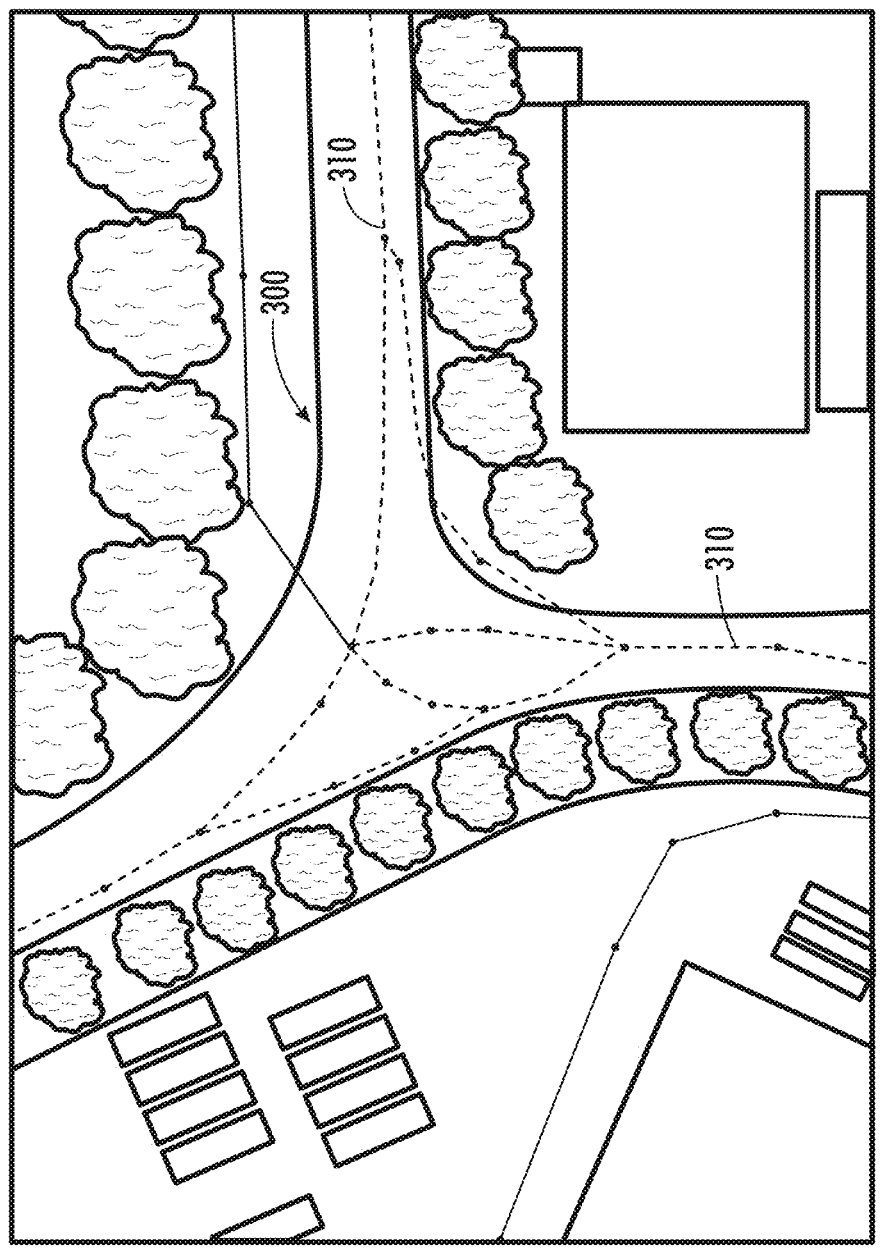
Figure 6:
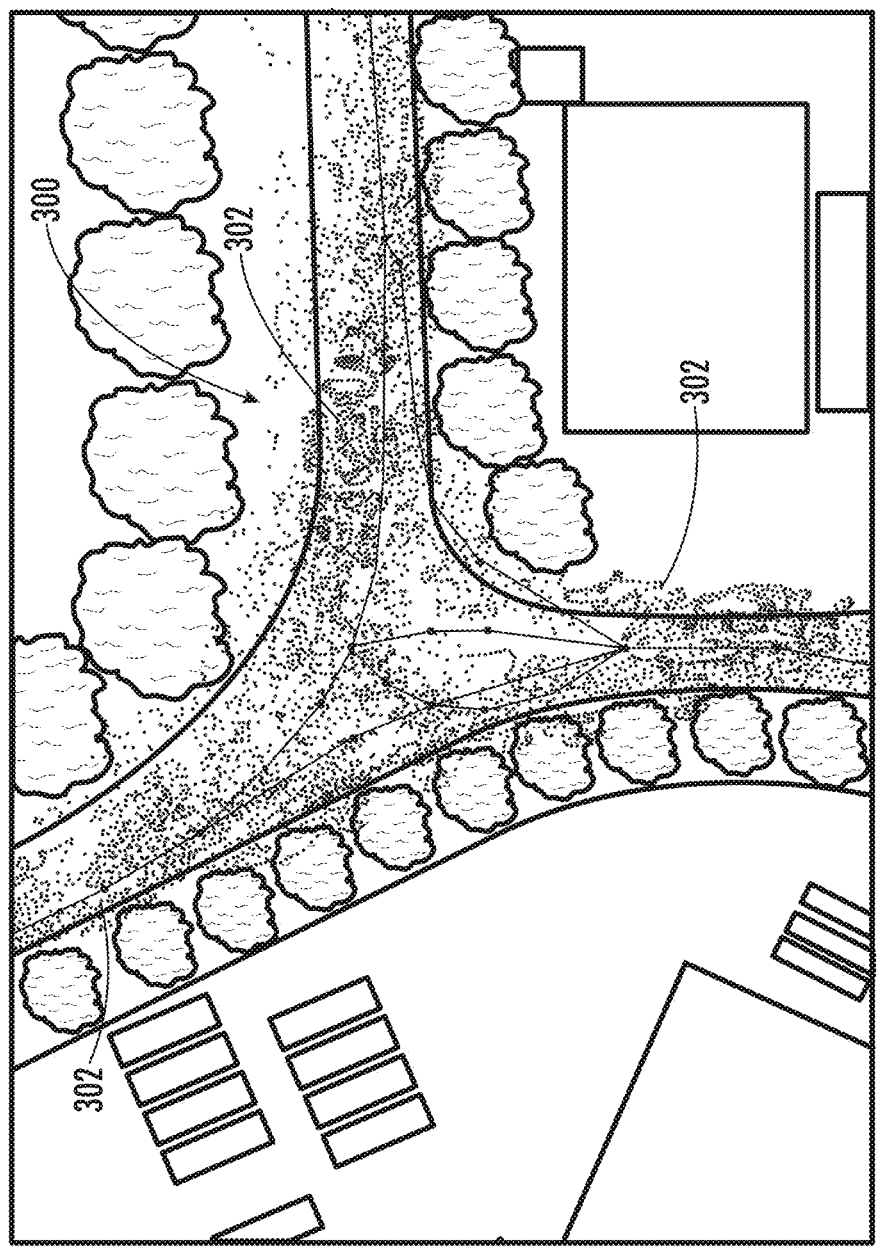
Figure 7:
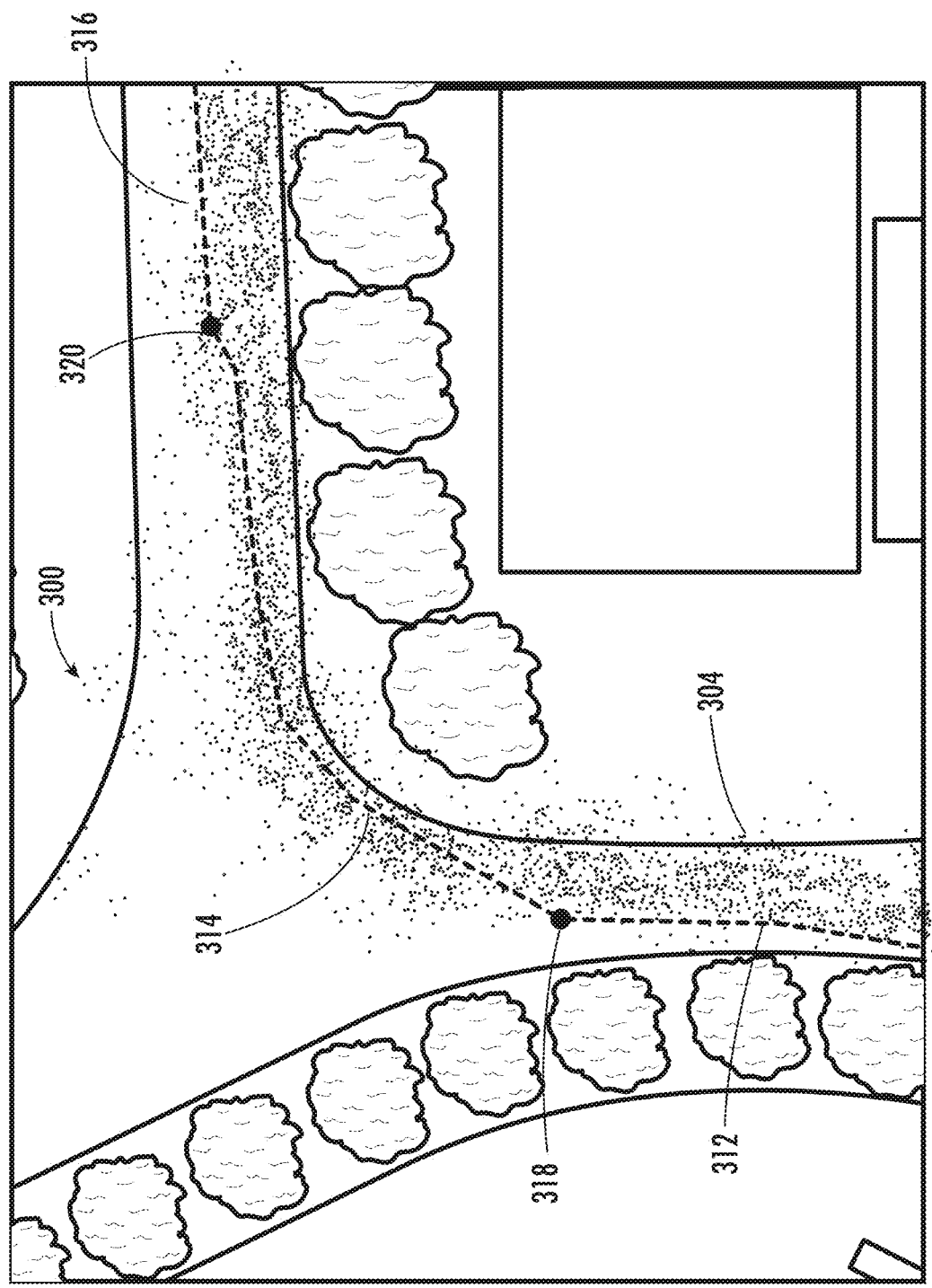
Figure 8:
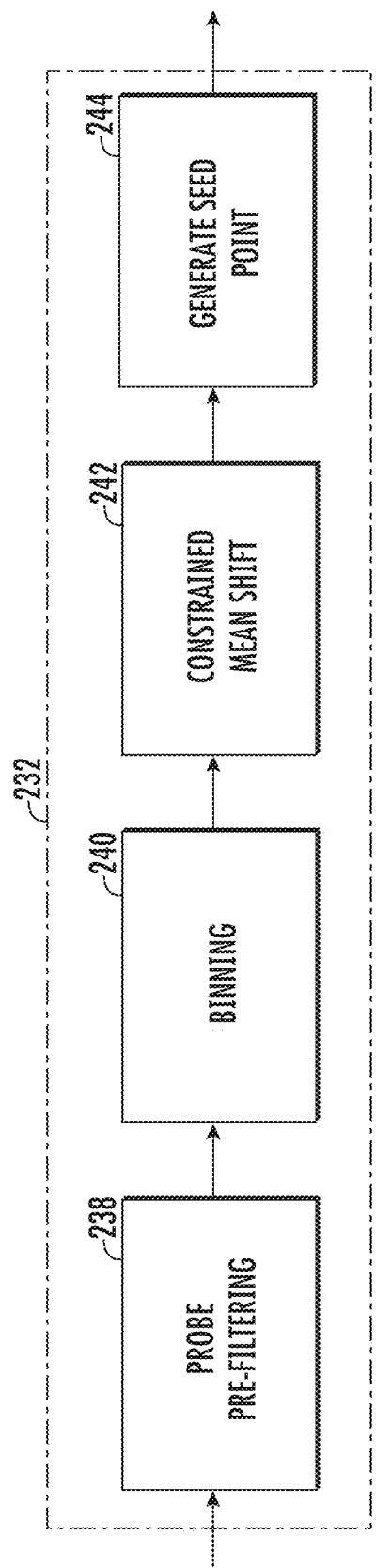
Figure 9:
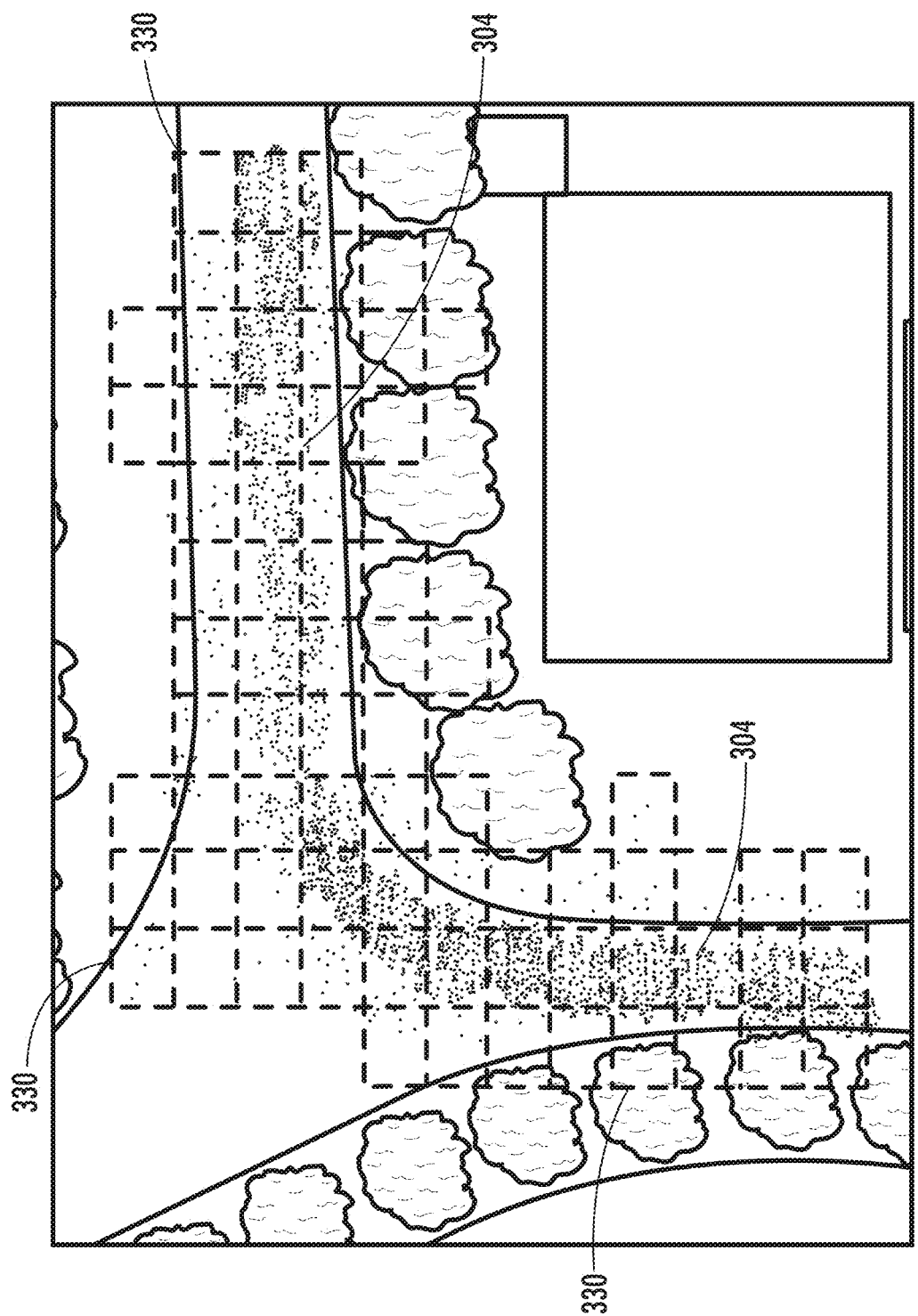
Figure 10:
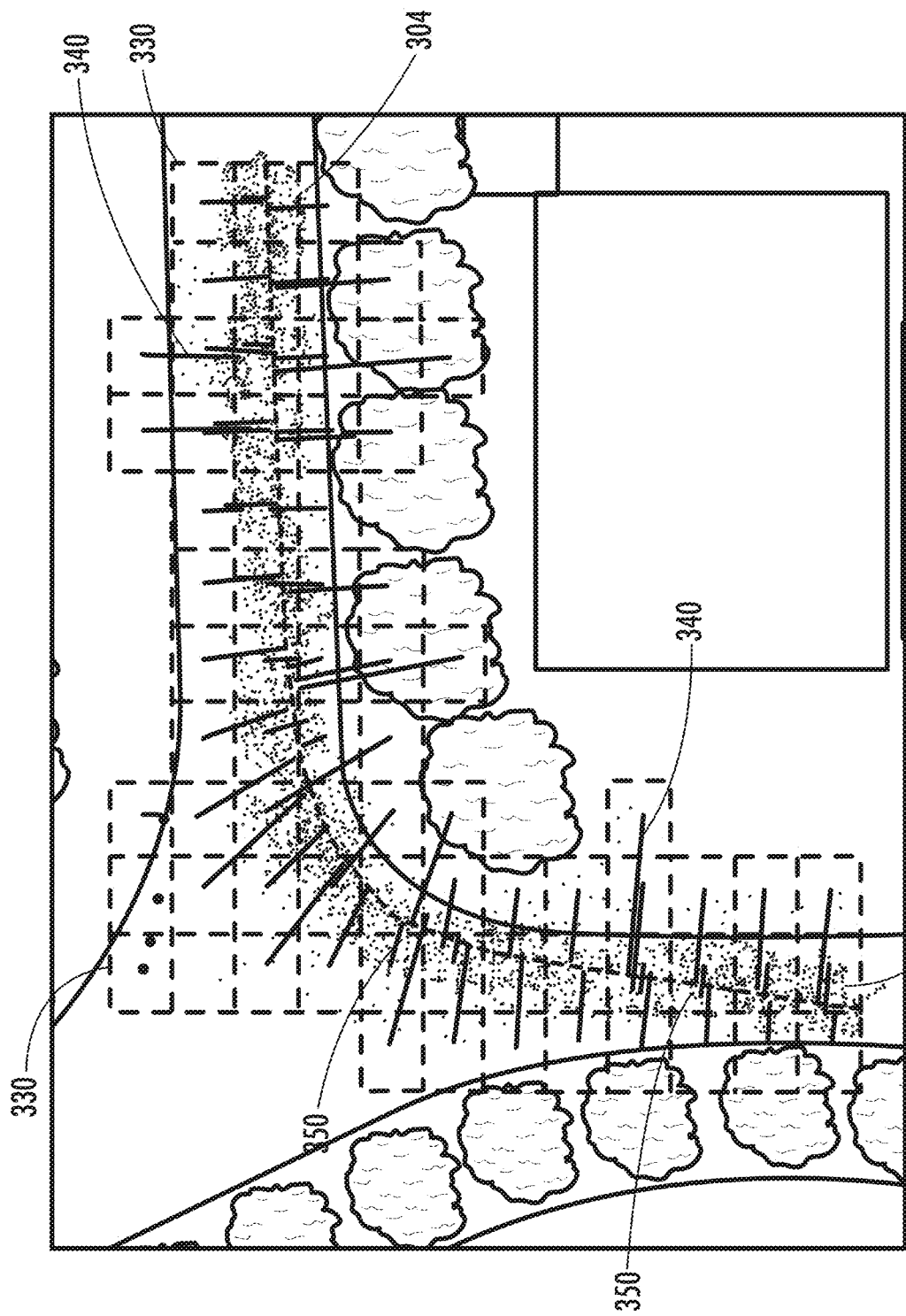
Figure 11:
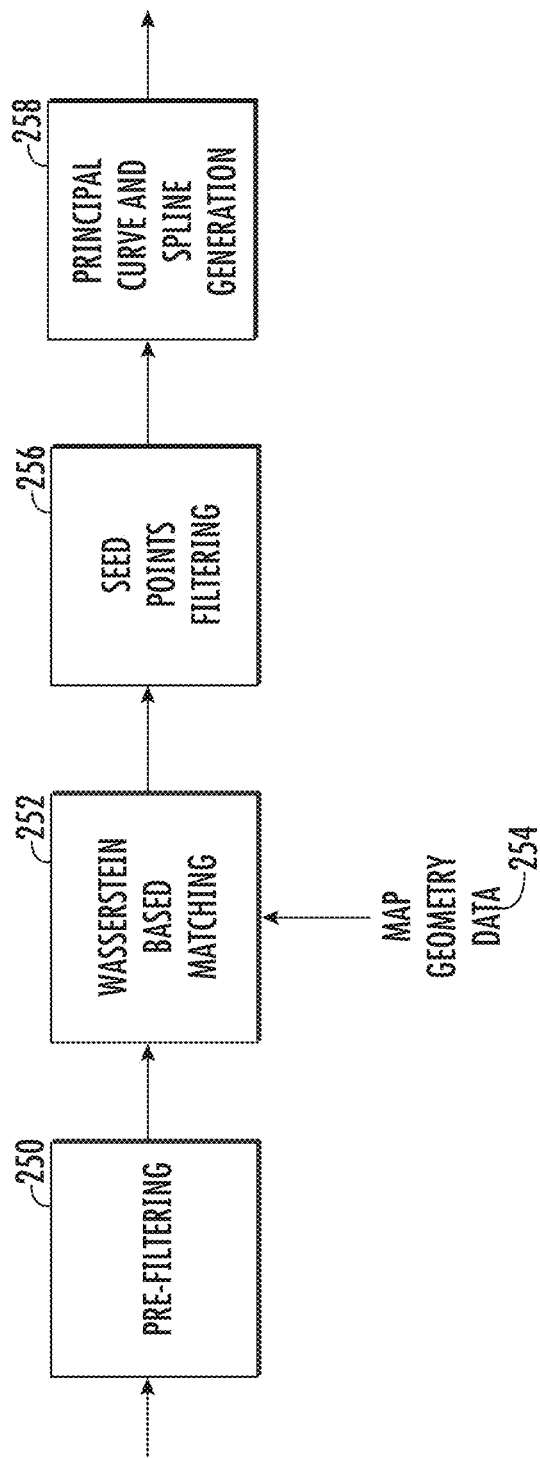
Figure 12:
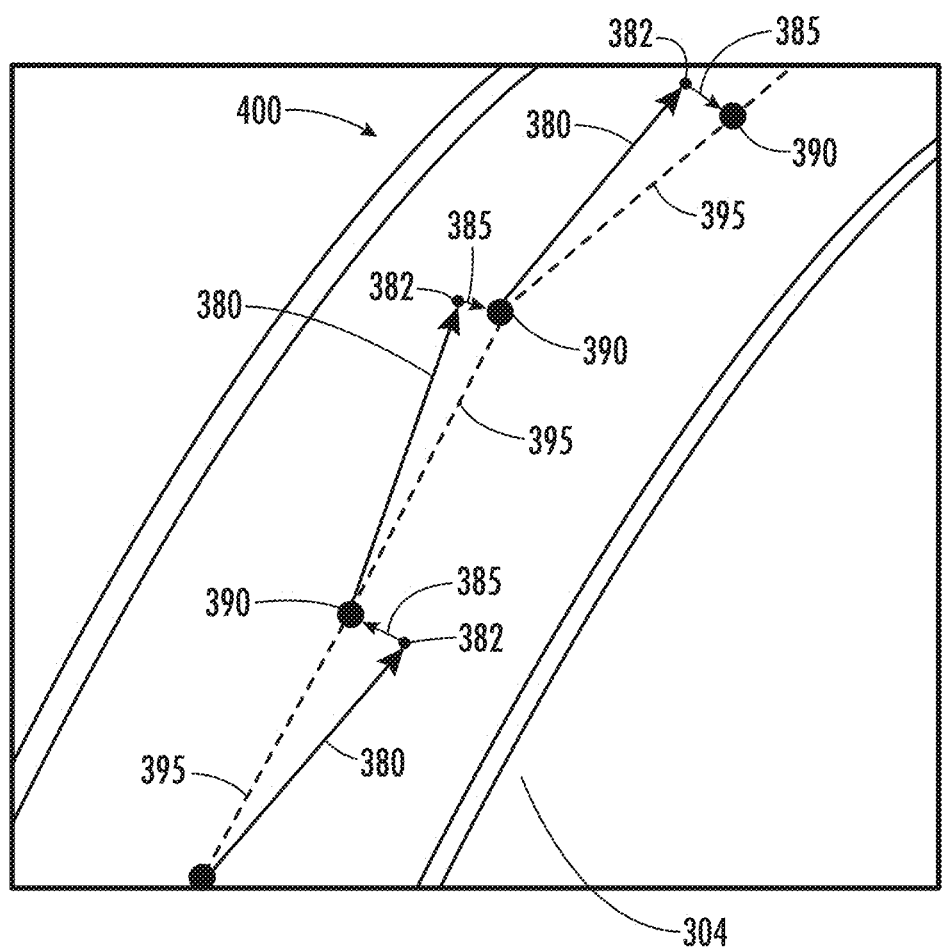
Figure 13:
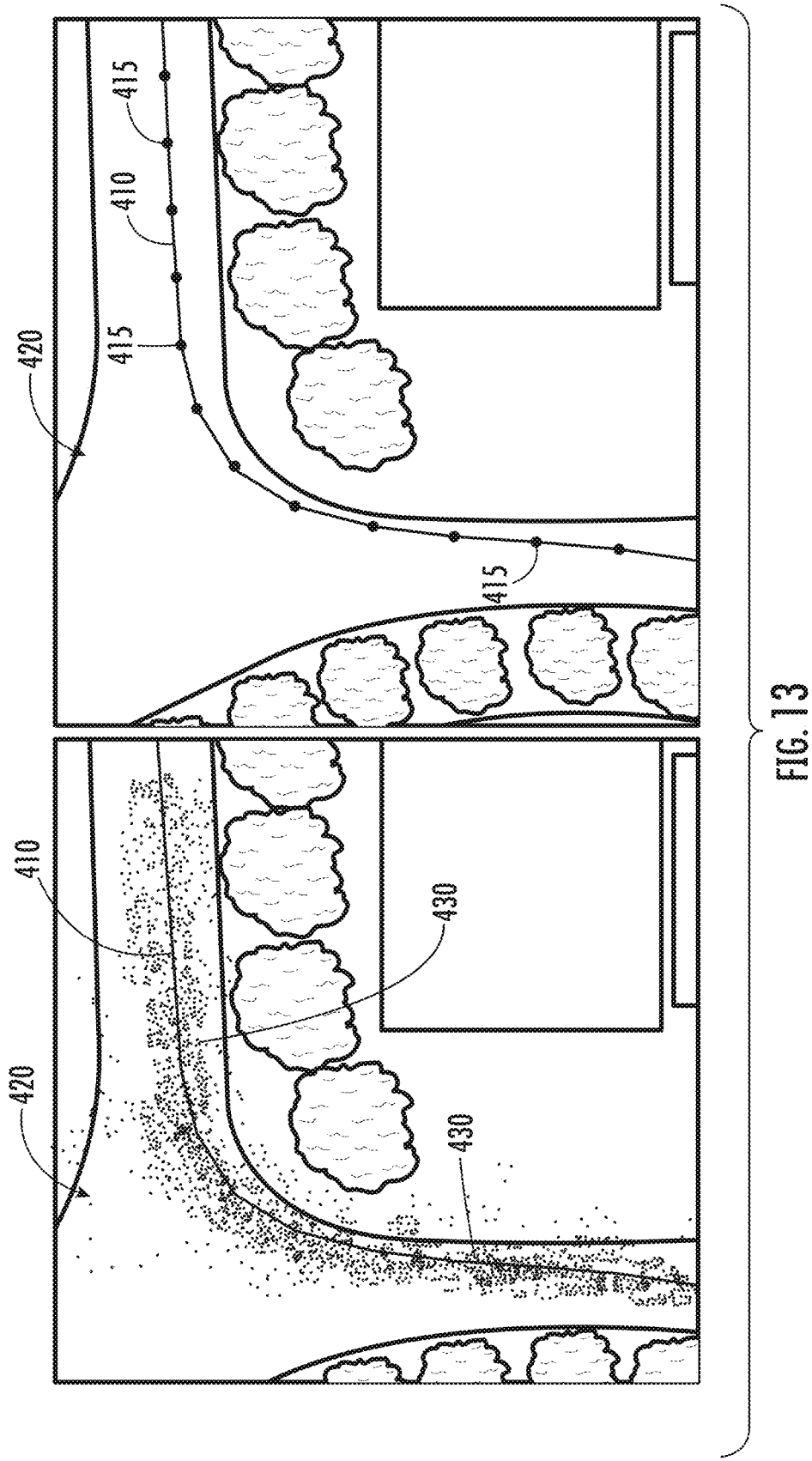
Figure 14:
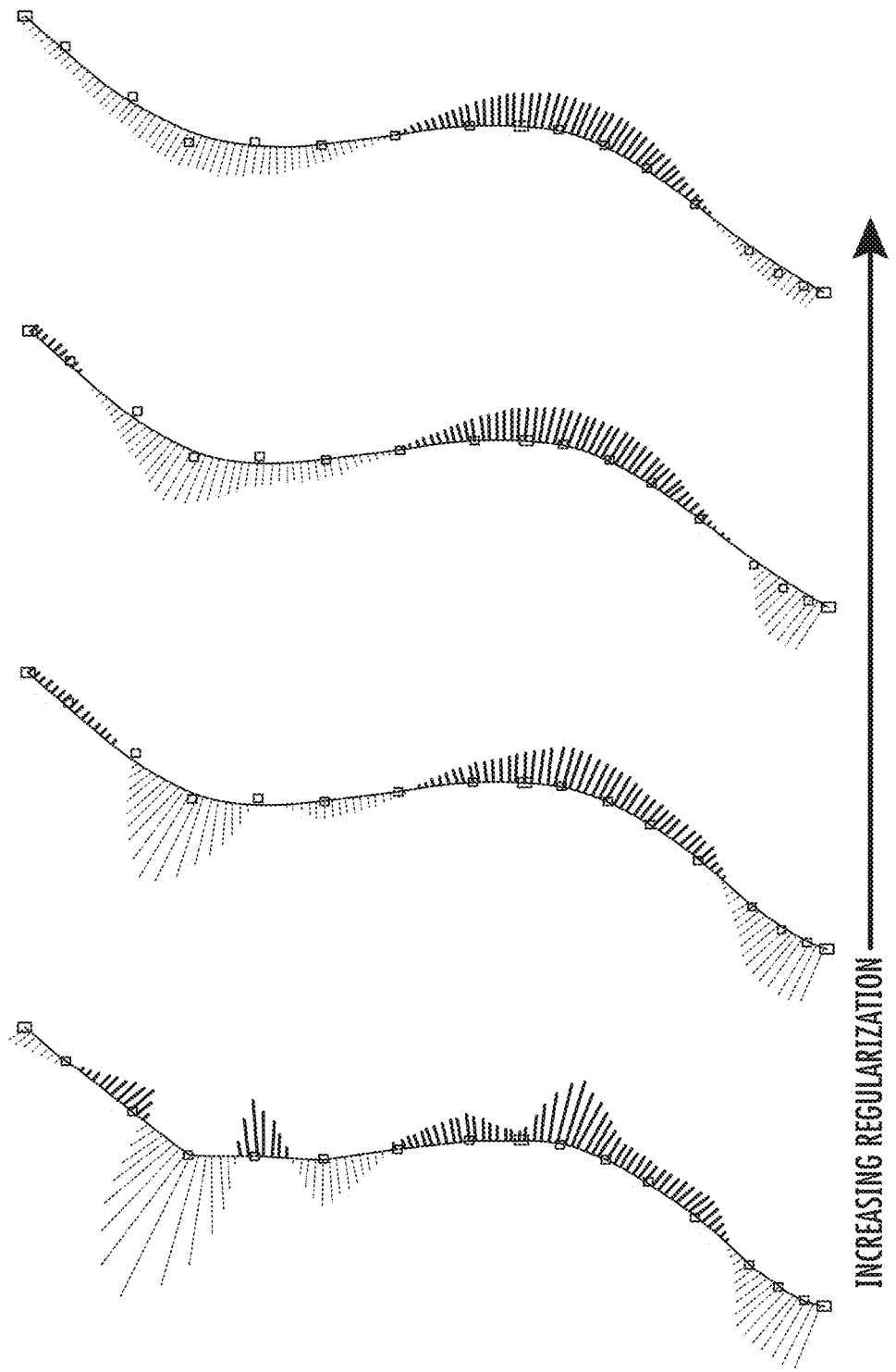
Figure 15:
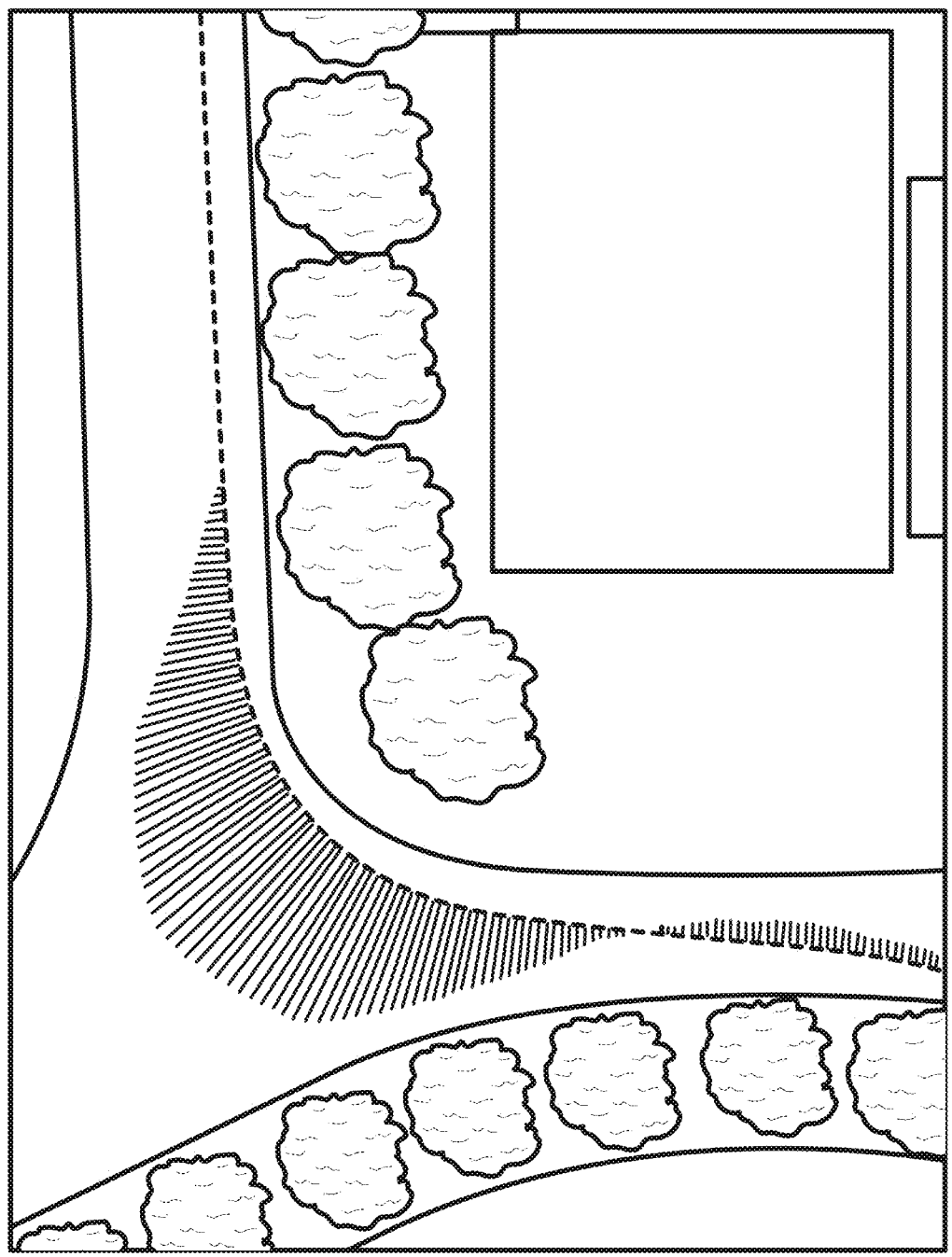
Figure 16:
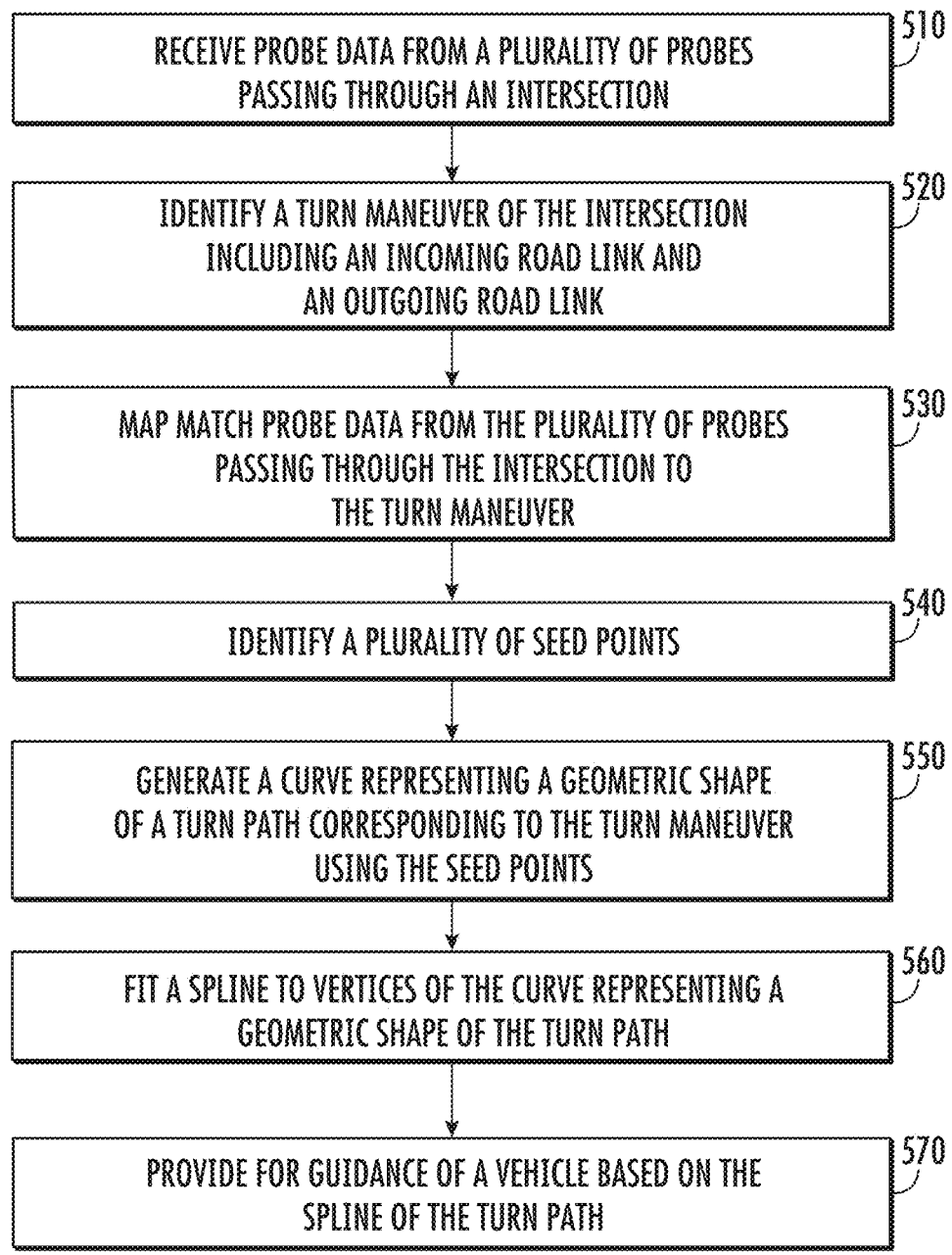

Having thus described example embodiments of the disclosure in general terms, reference will now be made to the accompanying drawings, which are not necessarily drawn to scale, and wherein:

FIG. 1 illustrates a block diagram of a system for creating map intersection turn paths according to an example embodiment of the present disclosure;

FIG. 2 is a block diagram of an apparatus for creating map intersection turn paths according to an example embodiment of the present disclosure;

FIG. 3 is a flowchart of a method for creating map intersection turn paths according to an example embodiment of the present disclosure;

FIG. 4 is a flow diagram depicting a curvature detection module according to an example embodiment of the present disclosure;

FIG. 5 illustrates a road intersection including road map geometry according to an example embodiment of the present disclosure;

FIG. 6 illustrates the road intersection of FIG. 5 with probe data of vehicles passing through the intersection according to an example embodiment of the present disclosure;

FIG. 7 illustrates a turn maneuver of the road intersection of FIG. 5 including probe data map matched to the turn maneuver according to an example embodiment of the present disclosure;

FIG. 8 is a flow diagram depicting the operations of probe seed point generation submodule of FIG. 4 according to an example embodiment of the present disclosure;

FIG. 9 illustrates the probe data points of FIG. 7 binned to grid cells according to an example embodiment of the present disclosure;

FIG. 10 illustrates the constrained stable weighted centers of mass for each grid cell according to an example embodiment of the present disclosure;

FIG. 11 is a flow diagram of the operations of the curve estimation submodule of FIG. 4 according to an example embodiment of the present disclosure;

FIG. 12 illustrates the creation of a principal curve according to an example embodiment of the present disclosure;

FIG. 13 illustrates the polyline curve of an example turn path through an intersection with and without probe data overlaid according to an example embodiment of the present disclosure;

FIG. 14 illustrates a progression shown from left to right of an increasing regularization for a curve according to an example embodiment of the present disclosure;

FIG. 15 illustrates the B-spline resulting from the principal curve of FIG. 13 according to an example embodiment of the present disclosure; and FIG. 16 is a flowchart for creating map intersection turn paths according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for creating map intersection turn paths, and more particularly, to automatically create two- or three-dimensional intersection turn path spline curves from probe data sources. A turn maneuver, as described herein, references the road geometry abstracting real road maneuver, which is retrieved from a database and constituted by a sequence of incoming and outgoing road links at a junction. This turn maneuver may not be fully representative of a turn path, which is described herein as a path followed by a vehicle traversing the turn maneuver. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a route along the road network to drive, such that accurate representations of the road are necessary, such as accurate representations of intersections and turn maneuvers there through.

Example embodiments described herein may further provide improved performance and fuel efficiency. Accurate turn paths through intersections facilitate highly assisted driving on urban and/or interurban roadways which may include fully autonomous control of the vehicle. A better understanding of the road geometry can improve an autonomous or highly-assisted driven vehicle to capitalize on aspects of the road such as where energy efficient coasting paths may be available. Further, embodiments may facilitate more accurate speed control due to an improved understanding of the road geometry. Engine and/or battery load management may be optimized with intelligent activation of peak torque through an understanding of maximum safe speeds and turn paths of a road. While the improvements to fully autonomous driving may be apparent, embodiments may improve semi-autonomous driving efficiency through driving assist features that have a better understanding of the road geometry. These features may combine to improve fuel efficiency and reduce power consumption throughout a drive cycle.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

An operation of an example apparatus will herein be described with reference to the flow chart of FIG. 3. The illustrated method may be performed, for example, by apparatus 200 using processor 202 with program code instructions stored in memory 204 to cause the apparatus to perform the operations of the method of FIG. 3. As shown, the road geometry is obtained at 210, for example, the road geometry may be obtained from previously generated map data, such as from map database 108. The probe data may include at least an indication of a position and/or a heading of one of a plurality of mobile objects, such as vehicles traversing the intersection. The indication of a position and a heading may be based on signals and/or sensor data captured at the mobile object and/or at a device moving along with the mobile object, such as a mobile device or smart phone. The heading of a mobile object includes the direction of movement of the object, such as a movement of the object along a road. While probe data may include the heading of a mobile device or vehicle, the probe data may simply include a position and a timestamp. Using a sequence of positions arranged by timestamp, a heading can be derived to provide an indication of the trajectory of the mobile device or vehicle. The content of such a data set is also referred to herein as probe data.

As shown at operation 212 of FIG. 3, the apparatus detects an intersection in the representation of the road geometry. The intersection may be a junction of any number of road segments within a limited area, and may be identified based on probe data patterns or based on road geometry which may include an intersection bounding polygon defining the intersection. The apparatus may define at least one turn maneuver between an entry to and an exit from the intersection as shown at 214, where the turn maneuver may be defined as a sequence of road segments such as an incoming road segment into the intersection, an outgoing road segment from the intersection, and a road section within the intersection, for example.

Probe data representative of vehicle trajectories may be map matched to the turn maneuver to define vehicles following a particular turn maneuver through the intersection as shown at 216. Seed points may be identified based on the map matched probe data as shown at 218. A curve may be established based on the seed points at 220, and a spline may be fitted to vertices of the curve at 222 to define the natural path or turn path of the turn maneuver through the intersection. The apparatus of the example embodiment may replace part of the created representation of the road geometry for the intersection using the at least one defined spline, or use the spline for turn paths through the intersection as shown at 224.

Creating turn maneuvers for intersections is useful for autonomous and semi-autonomous driving controls and other Advanced Driving Assistance Systems (ADAS). Example embodiments of the present disclosure provide that intersections, which may be detected in a representation of road geometry, are modeled by means of splines such as B-splines. A respective B-spline may be created between pairs of entries and exits from the intersection. Embodiments disclosed herein use probe data (e.g., crowd sourced location data) to fit a B-spline to vertices of a curve representing a geometric shape of a turn path corresponding to a turn maneuver, where the curve is generated from seed points established based on the probe data. In order to filter out probes not belonging to a specific turn maneuver, embodiments use a filtering technique to map match probe data points to the road links of the turn maneuver. The map matching may include evaluating probe data points not only by location, but by heading. Where heading is not available, the timestamped sequence of probe data points can provide an inferred heading of the probe data through which map matching can occur. The resulting filtered probe points are then used to create a polyline curve to approximate the turn. A spline is then fitted to vertices of the polyline curve with a B-spline using calculus of variations, minimizing the change of curvature, to yield a smooth spline. The turn path for a specific turn maneuver of an intersection can then be computed from the resultant B-spline. The published turn path curvature value can be derived in various ways from the spline, such as at the intersection node projection location or the largest curvature value for the turn path can be located along the spline. The B-spline itself or another representation, such as a sequence of one or more Bézier curves, can be published in an ADAS product. The spline can also be used to provide turn path curvature values for individual turn lanes.

Certain embodiments of the present disclosure therefore provide that intersections, which may be detected in a representation of a road geometry, are modeled by means of splines, such as a B-spline. A respective B-spline may be created between pairs of entries to and exits from the intersection. Once created, the B-splines for each intersection may replace the original representation of the intersection in the representation of the road geometry entirely or in part.

Embodiments provided herein may enable the creation of turn paths corresponding to realistic turn maneuver geometries even when the density of indicated positions is sparse and probe data is noisy. Certain embodiments may allow for the repair of defects, such as gaps, incorrect connections, or poor geometry shape in the original road geometry determined from probes. Embodiments may provide a refined representation of an intersection road geometry created automatically. Embodiments may be applicable to the creation of two-dimensional (2D) and three-dimensional (3D) map intersection road geometry.

According to an example embodiment, probe data for each intersection is determined using a bounding polygon (e.g., a rectangle) around the intersection. The probe data may then be initially filtered to remove slow-moving probes (e.g., under five miles per hour) and probes with noisy or erroneous headings or other anomalies.

Probe data from a plurality of vehicles and/or mobile devices may be map matched to an intersection, and specifically to the incoming and outgoing intersection road links or segments, including any intersection internal links that may correspond to a turn maneuver. The map matching process may use a static or dynamic link distance threshold (e.g., 15 meters) and a heading threshold (e.g., 15 degrees). Probe data outside of a distance of 15 meters from a road link or segment is not map matched to the road link, and probe data having a heading that is more than 15 degrees away from a heading of a road link may not be map matched to the road link. This filters out probe data that may be erroneous and restricts the map matched probe data to data that is likely to be traffic along the road link. The map matcher may be point-based (location) or trajectory-based (heading). The thresholds for map matching may be static or dynamic and may depend on the noise level in the probe data and/or on the intersection geometry.

Embodiments described herein may use the probe data to identify a principal curve to which a spline is fitted to the vertices of the curve for establishing a curvature of a turn path. To detect a curvature of a turn path, a curvature detection module may be implemented. FIG. 4 illustrates an example embodiment of the curvature detection module 230 that includes two submodules: the probe seed point generation module 232 and curvature estimation module 234. The probe seed point generation module 232 generates seed points from probe data that is map matched to a specific maneuver through an intersection. The principal curve is derived from the seed points, and a spline fitted to the vertices of the principal curve to form a turn path. The curvature estimation module 234 estimates curvature of the turn path from the fitted spline as detailed further below, with the projection of the intersection center or node onto the spline and a maximum spline curvature, for example. The curvature from the curvature estimation module 234 is provided for downstream analysis, spline fitting, and publication as described further below.

FIG. 5 illustrates an intersection 300 with road link geometry 310 that identifies the road links of the intersection. FIG. 6 illustrates the intersection 300 with probe data points 302 corresponding to vehicles and/or mobile devices traveling through the intersection 300. FIG. 7 illustrates the map matched probe data that is map matched to a maneuver through the intersection 300, otherwise referred to herein as turn maneuver probe data 304. The turn maneuver probe data 304 is map matched to the three components of the turn maneuver that include road links 312, 314, and 316 with nodes 318 and 320 disposed between the road links. The turn maneuver of FIG. 7 starts at road link 312, proceeds through the intersection internal link 314, and exits the intersection at road link 316.

The seed points generated through probe seed point generation module 232 are generated using a process as illustrated in FIG. 8. As shown, the probe data is pre-filtered at 238 to eliminate low-speed points that are prone to drifting and heading inaccuracy. The remaining probe data is then binned at 240 using a binning procedure that builds a grid over the probe data. The grid cells are sparse, and its configurable width is typically about the size of two road widths. The grid cells are sparse such that there must be at least one probe data point in each grid cell created. The probe data is divided into these grid cells such that independent, parallel processing of each grid cell may be performed.

FIG. 9 illustrates the probe data of FIG. 7 gridded into a plurality of cells 330 with probe data points 304 within each cell formed. For each grid cell, a constrained Stable Weighted Center of Mass is computed within a radius $R_{SCM}$ of the median probe point of the respective cell 330. The Stable Weighted Center of Mass points will be used as candidate seed points for detecting roads. At least one seed point per road segment is needed to capture the turn maneuver.

Referring back to FIG. 8, the Stable Weighted Center of Mass points are constrained to move perpendicularly to the probe heading and thus the road direction using a constrained mean shift at 242. As noted above, probe data may or may not include heading information; however, heading can be derived for a probe based on a timestamped sequence of probe data point locations. FIG. 10 illustrates this constraint with the Stable Weighted Center of Mass points of each cell 330 perpendicularly constrained via projection line 340 to the probe heading direction. The probe heading direction for a cell is the principal heading direction of the probe data points within that cell, where the cell's influence on the turn path for the turn maneuver is perpendicular to the principal heading direction of the cell. Therefore, only the perpendicular component of the gradient of the Mean Shift to the median probe heading directions is considered. The seed points 350 of a curvature of the turn path are created by iterating the projections of each cell that are perpendicular relative to the cell principal heading direction established by the probe headings within the cell 330. During each iteration, the principal heading is refined to reflect minor changes in local probe heading during the iteration path. Iteration stops when the seed point 350 is considered stationary, where stationary is considered when movement is below some predetermined distance threshold, such as 0.1 meters.

Without constraining the Mean Shift gradient direction, the stable weighted centers of mass tend to move along the road center to form seed clusters, which is undesirable. Thus, the stable weighted centers of mass are constrained in movement to be perpendicular to the road based on the median probe heading direction for the cell, which imposes an even seed distribution along the turn maneuver rather than creating bunches of disconnected seed points which would not produce a smooth, natural curve for the turn path.

Mean Shift, as described herein, is a non-parametric feature-space analysis technique for locating the maxima of a density function:

$$x_{(i+1)} = \mu(x_{(i)}) \text{ where } \mu(x) = \frac{\sum_{i=0}^{n} K_H(X_i - x)X_i}{\sum_{i=0}^{n} K_H(X_i - x)} \text{ until } x \text{ constant,}$$

In the instant case, $K_H(\cdot)$ is the Gaussian kernel function. The weighting is thus performed using a Gaussian kernel function in the above example; however, other kernels can be used. The center of mass is computed iteratively using the Mean Shift until it converges, where the change in location does not change within some predefined threshold. Note that the Stable Weighted Center of Mass may end up outside the bounds of the grid cell. Stable Weighted Center of Mass is also known as the Stable Weighted Expectation $\tilde{\mu}^x$ as Mean Shift center of mass $\mu^x$ around x. The center of mass is:

$$\mu(x) = \frac{\sum_{i=0}^{n} K_H(X_i - x)X_i}{\sum_{i=0}^{n} K_H(X_i - x)}$$

Where $K_H(\cdot)$ is the Gaussian kernel function:

$$K_H(\cdot) = e^{-\frac{1}{2}(\frac{X_i - x}{h})^2}$$

And h is the bandwidth. Other convolution kernels can be used, such as Uniform, Biweight, Epanechnikov, for example. The constrained, Mean Shifted Stable Weighted Centers of Mass are the generated seed points at 244 of FIG. 8.

The Curvature Estimation submodule 234 of FIG. 4 may use the seed points for curvature generation. However, the seed points may still include outliers that may adversely influence the generation of the curvature. While seed points provide a signature of raw probe data with drifting removed as much as possible, outliers may still exist. The issue of the presence and effect of outliers is compounded at complex intersections due to limitations of map matching such that probe data from other turn maneuvers at the same intersection may be included. Hence, embodiments may include a further filtering mechanism to mitigate the interference from these outliers.

Embodiments described herein may include a Wasserstein-distances-based filter by incorporating map maneuver information. Ideally, out-lying noisy probes are eliminated to leave only those seed points compatible with the subject turn maneuver. However, it is generally difficult to discriminate outliers against valid probes without aid from other sources such as satellite images. To achieve the desired noise reduction, road geometry may be leveraged to serve as prior information from which filtering is performed. Road geometry may be the underlying road geometry from map database 108 of the map services provider 116. Though the map geometry may not be consistently reliable, embodiments described herein incorporate the underlying maneuver information of the map geometry without relying upon the positional information therein.

FIG. 11 illustrates an example of the process in which seed points are input as pre-filtering at 250. The seed points are then processed based on Wasserstein based matching at 252. The collection of seed points may be represented as $X=\{x_i\}_{i=1}^{m}$ and the map geometry data 254 may be quantitized to obtain a collection of points represented as $Y=\{y_i\}_{i=1}^{n}$. A transformation mapping is performed T: $X \rightarrow Y$ such that the transformation has minimal overall efforts (e.g., the minimal deformation efforts from X to Y. This task is the Wasserstein distance or Earth Mover Distance (EMD) minimization problem. Specifically, the point cloud X to Y is treated as the supports of uniform distributions X to Y, respectively. The effort moving a point mass $x_i$ to $y_j$ is denoted as $f_{ij}$, the (i,j) entry of non-negative matrix $F \in \mathbb{R}^{m \times n}$ and the following regularized optimization for optimal matrix F is solved:

$$f^* = \text{argmin} \sum_{i,j} f_{ij} M_{ij} + \lambda \Omega(f)$$

Such that:

$$F1=X, F^T1=Y, \text{ and } F \geq 0$$

Where "1" is a vector with all 1-valued entries; $\Omega(\cdot)$ denotes the regularizer function with coefficient $\lambda$; and $M_{ij}$ is a distance matrix between $x_i$ to $y_j$. The optimal transformation is consequently calculated as:

$$T(x_i) = y_{\text{argmax}_j f_{ij}}$$

For the detection module, we constitute the underlying distance and regularizer with Euclidean distance and quadratic regularization $$\|\cdot\|_2^2$$

with coefficient $\lambda=0.3$, respectively. Further, a cubic-spline fitting is used to yield a smooth curve geometry. Once the optimal transformation T is found, the heading agreement is compared between $x_i$ to $T(x_i)$ so that only the seed points with angle difference below a predetermined value will be preserved. Further, a density-based clustering may be applied to remove any residual outliers such that the seed points are filtered at 256. Finally, a principal curve is generated at 258 based on the filtered seed points and consequent curvature values are estimated based on a resultant fitted B-spline.

Before the spline generation occurs, the remaining seed points after seed point filtering of 256 are used for principal curve generation. The remaining seeds are remaining Stable Weighted Centers of Mass, such that for the remaining Stable Weighted Center of Mass of the grid cell, the largest Principal Component $\gamma^x$ is computed for radius $R_{PCM}$ centered at its Stable Weighted Center of Mass $\tilde{\mu}^x$ using the probe heading information, whether provided in the probe data or derived therefrom. The largest Principal Component $\gamma^x$ indicates the orientation of the majority of probe points in that particular neighborhood or cell and thus the local orientation of the turn maneuver. This orientation is used to determine the direction to look for the presence of additional probe points forming the turn maneuver. A technique such as the Principal Component Analysis (PCA), which is a dimensionality reduction technique, may be used to derive the Principal Components.

A Heading Density for the neighborhood of probe data points in radius R around each clustered Stable Weighted Center of Mass may be computed. The Heading Density is a metric indicating the amount of probe points with compatible headings. For example, the headings within a threshold angle $\theta_{thresh}$ with respect to the local road heading(s) $\gamma^x$.

The Stable Weighted Center of Mass $\mu^x$ seed points are entered in a processing list and sorted by Heading Density, with the highest density first. This enables processing of the highest density seed points first which are the best candidates for creating the principal curve for the turn path of the turn maneuver as they have the most similar probe headings reflecting a true road direction. If the probe data for the turn maneuver is sparse, the initial seed point may not create the full turn path curve. Other seed points may then continue the turn path geometry and snap to the existing curve completing the geometry for the turn path.

In both directions ($\gamma^x$, $-\gamma^x$) along the Principal Component for the remaining Stable Weighted Center of Mass seed point with the highest weight, starting at $x_0 = \mu^x$, a polyline is created that follows the center of the probe points with consistent heading until any of the following stopping criteria is reached: No more heading compatible probe points are found; or the polyline is snapped to a vertex of a previous curve section of the turn path. To snap to the vertex of a pervious curve section, a new value of x is found by following the first principal component $\gamma^x$ at $x_{i+1}$:

$$x_{i+1} = x_i + s\gamma^x,$$

where s is some step size.

A principal component analysis is performed to update the principal component $\gamma^x$ using Median Vector locally at x, for probes with compatible headings with respect to $\gamma^x$, ensuring that the direction of $\gamma^x$ is maintained.

A stable weighted expectation is calculated as Mean Shift center of mass $\mu^x$ around $x_{i+1}$ using a Gaussian kernel function but movement is constrained perpendicularly to the principal component of $\gamma^x$. Principal curves are created by moving a step in the principal heading direction followed by a heading refinement and Mean Shift iteration back to the turn maneuver center to create the next vertex. FIG. 12 illustrates an example of the creation of the principal curve along segments 395 with the principal heading direction shown by the arrows 380 along road 400. The heading refinement and Mean Shift iteration is shown by arrows 385, bringing the Stable Weighted Centers of Mass 382 defining the curve back to the principal curve path defined by segments 395 center to create the next vertex 390.

One or more principal curves are created through principal curve formation using the seed points by extending the principal curve from a first point to a second point by a predefined distance in the orientation of the principal component of the first point. Referring again to FIG. 12, the predefined distance in the orientation of the principal component of a seed point 390 is represented as 380. A constrained Stable Weighted Center of Mass for the second point 382 is computed with an iterated Mean Shift 385 perpendicular to the principal component 380. This is repeated along the extension of the principal curve in the orientation of the principal component of the next point, where the principal curve is identified as the turn path.

Embodiments may search for pre-existing heading compatible vertex points v near edge $x_i$, $\mu^x$ to snap to, if any. If a vertex point v is found along edge $x_i$, $\mu^x$, the Stable Weighted Center of Mass $\mu^x$ is replaced with found vertex v and added to polyline as vertex $x_{i+1} = v$. All seed points within a distance R along an updated edge $x_i$, $x_{i+1} = v$ with heading that is within some heading threshold to the edge $x_i$, $x_{i+1}$ are removed from the seed point processing list. The polyline has thus converged in this direction.

If a vertex point is not found along edge $x_i$, $\mu^x$, the Stable Weighted Center of Mass $\mu^x$ is added to the polyline as vertex $x_{i+1} = \mu^x$, and all seed points within distance R along edge $x_i$, $x_{i+1}$ with heading that is within some heading threshold to the edge $x_i$, $x_{i+1}$ are removed from the seed point processing list. The polyline continues to evolve through deciphering if a next vertex point exists or not. If the Mean Shift has no probe points with consistent headings, then the polyline has converged in the direction and becomes part of the principal curve having vertices to which a spline is fit. This process that begins with growing the polyline in the $\gamma^x$ direction may then be performed again starting at the seed point but in the opposite direction of the Principal Component, namely the $-\gamma^x$ direction.

The aforementioned process generates a polyline curve of a turn path corresponding to a turn maneuver through the intersection using the available probe data. As this polyline curve may not be smoothed and refined sufficiently for use with an ADAS, particularly when guiding an autonomous vehicle along the turn path, a spline may be fit to the vertices of the polyline to create a smooth, natural curve or "turn path" of the turn maneuver through the intersection.

The spline is fit to the vertices of the principal curve polyline. FIG. 13 illustrates the polyline curve 410 of an example turn path through an intersection 420 with and without probe data 430. The polyline curve includes vertices 415. To fit a spline to the vertices of the principal curve polyline, a knot vector for the B-spline curve fit is created where the parametric distance between each knot is inversely proportional to the curvature of the turn path. This can be accomplished using Douglas-Peucker line approximation to the principal curve polyline to select the subset of vertices to use as knots. Another technique for creating the knot vector may be to employ a two-stage spline fit. In the first stage, a uniform (i.e. equally spaced) knot vector may be used for the initial spline fit. In the second stage, a knot vector for the second B-spline curve fit is created where the parametric distance between each knot is inversely proportional to the curvature of the initially fitted spline. The parametric knot vector value range is typically parameterized from $t_0 = 0.0$ at the beginning of the B-spline to $t_m = 1.0$ at the end of the B-spline. A parametric B-spline $u_i$ value is assigned to each turn path vertex $x_i$ based on the arc-length location along the curve. When an initial spline fit is used to create the knot vector, the initial spline can then also be used the determine the arc length based point parameterization by projecting each vertex $x_i$ of the principal curve polyline onto the spline. The arc length position of each curve vertex is normalized by the total arch length of the curve. This yields a parameterized probe point range from u=0.0 at the beginning of the B-spline to u=1.0 at the end of the B-spline.

The B-spline is then fitted to the vertices by minimizing the following function:

$$\mathfrak{I} = \mathrm{MIN}\left\{\sum_{i=0}^{n}(p_i - f(u_i))^2 + v_j \int_{\Omega}\left|\frac{\partial k}{\partial s}\right|^2 ds\right\}$$

This regularization function reduces or minimizes the change of curvature using regularization to keep the curvature of the spline as smooth as possible while still staying consistent (e.g., close to) the constraints (e.g., the probe points $p_i$) of the turn path. The regularization factor $v_j$ controls the tradeoff between the least squares term and the smoothness term. Generally, the value for the regularization factor is based, at least in part, on the classification of the road (e.g., highway, two-lane urban road, one-lane road, etc.) The regularization factor $v_j$ is assigned to each knot interval of the spline. Increasing the regularization factor v increases the curve smoothness, as illustrated in FIG. 14, where a progression is shown from left to right of increasing regularization. FIG. 15 illustrates the resulting B-spline 440 with curvature porcupines 442 for the intersection 300 of FIG. 5. The resulting fitted B-spline 440 is a smooth analytical representation of the turn path and can be used in ADAS application as-is, converted to other representations (e.g., Bézier curve(s)), or curvature value(s) can be evaluated for the spline and provided in an ADAS product.

FIGS. 3 and 16 illustrate flowcharts depicting methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 16 illustrates a flowchart of a method according to an example embodiment of the present disclosure for generating turn paths for an intersection. As shown at 510, probe data is received from a plurality of probes passing through an intersection. A turn maneuver of the intersection is identified including an incoming road link and an outgoing road link at 520. Probe data from the plurality of probes passing through the intersection is map matched to the turn maneuver at 530. A plurality of seed points are identified at 540, where the seed points are iteratively created from the turn maneuver probe data. A curve representing a geometric shape of a turn path of the turn maneuver using the seed points is generated at 550. A spline is fit to vertices of the curve representing the geometric shape of the turn path at 560, and guidance is provided for a vehicle based on the spline of the turn path at 570.

In an example embodiment, an apparatus for performing the methods of FIG. 3 or 16 above may include a processor (e.g., the processor 202) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive probe data from a plurality of probes passing through an intersection;
   identify a turn maneuver of the intersection including at least an incoming road link and an outgoing road link;
   map match probe data from the plurality of probes passing through the intersection to the turn maneuver, wherein probe data map matched to the turn maneuver comprises turn maneuver probe data;

identify a plurality of seed points, wherein the plurality of seed points are iteratively created from the turn maneuver probe data;

generate a curve representing a geometric shape of a turn path corresponding to the turn maneuver using the seed points;

fit a spline to vertices of the curve representing a geometric shape of the turn path; and provide for guidance of a vehicle based on the spline of the turn path.

2. The apparatus of claim 1, wherein causing the apparatus to identify a plurality of seed points comprises causing the apparatus to:

segment the turn maneuver probe data into a plurality of grid cells;

compute a stable weighted center of mass for turn maneuver probe data in each of the plurality of grid cells; and iteratively apply a mean shift to the stable weighted center of mass for the plurality of grid cells until a location change of the stable weighted center of mass is less than a predetermined distance to obtain seed points for the plurality of grid cells.

3. The apparatus of claim 2, wherein the stable weighted center of mass for a cell is constrained to move perpendicularly to a principal heading direction of the respective cell.

4. The apparatus of claim 2, wherein the mean shift of the stable weighted center of mass for the plurality of cells is applied with a weighting function.

5. The apparatus of claim 4, wherein the weighting function comprises a Gaussian kernel function.

6. The apparatus of claim 2, wherein causing the apparatus to generate the curve representing the geometric shape of the turn path using the seed points comprises causing the apparatus to:

identify principal components of the shifted stable weighted centers of mass for the plurality of grid cells;

establish an orientation of the principal components of the shifted stable weighted centers of mass for the plurality of grid cells; and generate the curve representing the geometric shape of the turn path based, at least in part, on the orientation of the principal components of the shifted stable weighted centers of mass for the plurality of grid cells.

7. The apparatus of claim 6, wherein causing the apparatus to generate the curve representing the geometric shape of the turn path using the seed points comprises causing the apparatus to:

establish a heading density of turn maneuver probe data within a predefined radius around the shifted stable weighted centers of mass for the plurality of grid cells; and generate the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

8. The apparatus of claim 1, wherein causing the apparatus to fit a spline to the vertices of the curve representing a geometric shape of the turn path comprises causing the apparatus to:

create a knot vector for the spline wherein a parametric distance between each knot is inversely proportional to a curvature of the curve.

9. The apparatus of claim 8, wherein causing the apparatus to fit a spline to the vertices of the curve representing a geometric shape of the turn path further comprises causing the apparatus to:

assign a parametric B-spline value to each curve vertex based on a vertex arc-length location along the curve.

10. The apparatus of claim 9, wherein causing the apparatus to fit a spline to the vertices of the curve representing a geometric shape of the turn path further comprises causing the apparatus to:

reduce a change of curvature using a regularization function to smooth a curvature of the spline with a regularization factor.

11. The apparatus of claim 1, wherein causing the apparatus to generate a curve representing a geometric shape of the turn path using the seed points comprises causing the apparatus to:

map match the seed points using Wasserstein distance based matching; and generate a curve representing the geometric shape of the turn path based on seed points having a heading angle difference below a predefined threshold.

12. A computer program product comprising at least one non-transitory computer-readable storage medium having computer-executable program code instructions stored therein, the computer-executable program code instructions comprising program code instructions to:

receive probe data from a plurality of probes passing through an intersection;

identify a turn maneuver of the intersection including at least an incoming road link and an outgoing road link;

map match probe data from the plurality of probes passing through the intersection to the turn maneuver, wherein probe data map matched to the turn maneuver comprises turn maneuver probe data;

identify a plurality of seed points, wherein the plurality of seed points are iteratively created from the turn maneuver probe data;

generate a curve representing a geometric shape of a turn path corresponding to the turn maneuver using the seed points;

fit a spline to vertices of the curve representing a geometric shape of the turn path; and provide for guidance of a vehicle based on the spline of the turn path.

13. The computer program product of claim 12, wherein the program code instructions to identify the plurality of seed points comprise program code instructions to:

segment the turn maneuver probe data into a plurality of grid cells;

compute a stable weighted center of mass for turn maneuver probe data in each of the plurality of grid cells; and iteratively apply a mean shift to the stable weighted center of mass for the plurality of grid cells until a location change of the stable weighted center of mass is less than a predetermined distance to obtain seed points for the plurality of grid cells.

14. The computer program product of claim 13, wherein the stable weighted center of mass for a cell is constrained to move perpendicularly to a principal heading direction of the respective cell.

15. The computer program product of claim 13, wherein the mean shift of the stable weighted center of mass for the plurality of cells is applied with a weighting function.

16. The computer program product of claim 15, wherein the weighting function comprises a Gaussian kernel function.

17. The computer program product of claim 13, wherein the program code instructions to generate the curve representing the geometric shape of the turn path using the seed points comprise program code instructions to:
- identify principal components of the shifted stable weighted centers of mass for the plurality of grid cells;
- establish an orientation of the principal components of the shifted stable weighted centers of mass for the plurality of grid cells; and
- generate the curve representing the geometric shape of the turn path based, at least in part, on the orientation of the principal components of the shifted stable weighted centers of mass for the plurality of grid cells.

18. The computer program product of claim 17, wherein the program code instructions to generate the curve representing the geometric shape of the turn path using the seed points comprise program code instructions to:
- establish a heading density of turn maneuver probe data within a predefined radius around the shifted stable weighted centers of mass for the plurality of grid cells; and
- generate the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

19. The computer program product of claim 12, wherein the program code instructions to generate a curve representing a geometric shape of the turn path using the seed points comprises program code instructions to:
- map match the seed points using Wasserstein distance based matching; and
- generate a curve representing the geometric shape of the turn path based on seed points having a heading angle difference below a predefined threshold.

20. A method comprising:
- receiving probe data from a plurality of probes passing through an intersection;
- identifying a turn maneuver of the intersection including at least an incoming road link and an outgoing road link;
- map matching probe data from the plurality of probes passing through the intersection to the turn maneuver, wherein probe data map matched to the turn maneuver comprises turn maneuver probe data;
- identifying a plurality of seed points, wherein the plurality of seed points are iteratively created from the turn maneuver probe data;
- generating a curve representing a geometric shape of a turn path corresponding to the turn maneuver using the seed points;
- fitting a spline to vertices of the curve representing a geometric shape of the turn path; and
- providing for guidance of a vehicle based on the spline of the turn path.

21. The method of claim 20, wherein identifying the plurality of seed points comprises:
- segmenting the turn maneuver probe data into a plurality of grid cells;
- computing a stable weighted center of mass for turn maneuver probe data in each of the plurality of grid cells; and
- iteratively applying a mean shift to the stable weighted center of mass for the plurality of grid cells until a location change of the stable weighted center of mass is less than a predetermined distance to obtain seed points for the plurality of grid cells.

22. The method of claim 21, wherein generating the curve representing the geometric shape of the turn path using the seed points comprises:
- establishing a heading density of turn maneuver probe data within a predefined radius around the shifted stable weighted centers of mass for the plurality of grid cells; and
- generating the curve representing the geometric shape of the turn path based, at least in part, on the orientation of the principal components of the shifted stable weighted centers of mass for the plurality of grid cells and on the heading density of the shifted stable weighted centers of mass for the plurality of grid cells.

* * * * *